United States Patent
Chen et al.

(10) Patent No.: US 10,804,541 B2
(45) Date of Patent: Oct. 13, 2020

(54) ELECTRODE AND DEVICE EMPLOYING THE SAME

(71) Applicant: Industrial Technology Research Institute, Hsinchu (TW)

(72) Inventors: Kuang-Yao Chen, Ji'an Township (TW); Ting-Wei Huang, Hsinchu (TW); Chien-Chih Chiang, New Taipei (TW); Chun-Hsing Wu, Taipei (TW); Chang-Chung Yang, Taipei (TW); Wen-Sheng Chang, Pingtung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 31 days.

(21) Appl. No.: 15/659,434

(22) Filed: Jul. 25, 2017

(65) Prior Publication Data
US 2018/0097236 A1   Apr. 5, 2018

(30) Foreign Application Priority Data
Oct. 3, 2016   (TW) .............................. 105131870 A

(51) Int. Cl.
*H01M 4/80* (2006.01)
*H01M 4/76* (2006.01)
(Continued)

(52) U.S. Cl.
CPC ........... *H01M 4/808* (2013.01); *H01M 4/043* (2013.01); *H01M 4/0404* (2013.01);
(Continued)

(58) Field of Classification Search
None
See application file for complete search history.

(56) References Cited

U.S. PATENT DOCUMENTS

| 5,723,232 A | 3/1998 | Yamada et al. |
| 6,309,532 B1 | 10/2001 | Tran et al. |

(Continued)

FOREIGN PATENT DOCUMENTS

| CN | 1277466 A | 12/2000 |
| CN | 101719542 A | 6/2010 |

(Continued)

OTHER PUBLICATIONS

Chang et al., "A Carbon- and Binder-Free Nanostructured Cathode for High-Performance Nonaqueous Li—$O_2$ Battery", Advanced Science 2015, 2, 1500092, Total of 6 pages.

(Continued)

*Primary Examiner* — Carmen V Lyles-Irving
(74) *Attorney, Agent, or Firm* — Birch, Stewart, Kolasch & Birch, LLP

(57) ABSTRACT

An electrode and a device employing the same are provided. The electrode includes a main body, and an active material. The main body includes a cavity and is made of a conductive network structure. In particular, the active material is disposed in the cavity, wherein the length of the longest side of the particle of the active material is greater than the length of the longest side of the pore of the conductive network structure such that the active material is confined in the conductive network structure.

10 Claims, 9 Drawing Sheets

(51) Int. Cl.
*H01M 4/04* (2006.01)
*H01M 4/1393* (2010.01)
*H01M 4/133* (2010.01)
*H01M 4/587* (2010.01)
*H01M 4/66* (2006.01)
*H01M 10/054* (2010.01)
*H01M 10/056* (2010.01)

(52) U.S. Cl.
CPC ......... *H01M 4/0423* (2013.01); *H01M 4/133* (2013.01); *H01M 4/1393* (2013.01); *H01M 4/587* (2013.01); *H01M 4/661* (2013.01); *H01M 4/762* (2013.01); *H01M 10/054* (2013.01); *H01M 10/056* (2013.01); *H01M 2300/0045* (2013.01); *Y02E 60/13* (2013.01)

(56) References Cited

U.S. PATENT DOCUMENTS

| | | | |
|---|---|---|---|
| 8,790,814 | B2 | 7/2014 | Wang et al. |
| 9,263,745 | B2 | 2/2016 | Zinck et al. |
| 9,660,310 | B2* | 5/2017 | Mak .................. H01M 4/8605 |
| 2009/0162736 | A1 | 6/2009 | Vallance et al. |
| 2012/0263993 | A1* | 10/2012 | Hosoe .................. H01G 11/06 |
| | | | 429/131 |
| 2014/0220441 | A1 | 8/2014 | Ogg et al. |
| 2014/0342219 | A1* | 11/2014 | Takahashi .......... H01M 10/058 |
| | | | 429/178 |
| 2015/0093660 | A1 | 4/2015 | Barde |
| 2015/0228978 | A1* | 8/2015 | Gadkaree .................. B22F 7/04 |
| | | | 429/199 |
| 2015/0249261 | A1* | 9/2015 | Dai .................. H01M 10/054 |
| | | | 429/336 |
| 2015/0303000 | A1 | 10/2015 | Okuno et al. |
| 2016/0049661 | A1* | 2/2016 | Ota ........................ H01M 4/70 |
| | | | 429/241 |
| 2017/0104204 | A1* | 4/2017 | Zhamu ................ H01M 4/0416 |

FOREIGN PATENT DOCUMENTS

| | | |
|---|---|---|
| CN | 104078679 B | 8/2015 |
| DE | 102015108488 A1 | 12/2015 |
| KR | 10-2004-0096381 A | 11/2004 |
| WO | WO 2015/068143 A1 | 5/2015 |

OTHER PUBLICATIONS

Ha et al., "Binder-Free and Carbon-Free Nanoparticle Batteries: A Method for Nanoparticle Electrodes without Polymeric Binders or Carbon Black", ACS Publications, 2012 American Chemical Society, pp. 5122-5130.

Ji et al., "Graphene-Encapsulated Si on Ultrathin-Graphite Foam as Anode for High Capacity Lithium-Ion Batteries", Advanced Materials 2013, 25, pp. 4673-4677.

Lin et al., "An ultrafast rechargeable aluminium-ion battery", Apr. 16, 2015, vol. 520, Nature, pp. 325-328.

Miao et al., "A lithium-sulfur cathode with high sulfur loading and high capacity per area: a binder-free carbon fiber cloth-sulfur material", Chem. Commun., 2014, 50, pp. 13231-13234.

Taiwanese Office Action 105131870 dated May 12, 2017.

Extended European Search Report for European Application No. 17193492.0, dated Nov. 30, 2017.

* cited by examiner

ELECTRODE AND DEVICE EMPLOYING THE SAME

CROSS REFERENCE TO RELATED APPLICATIONS

The application is based on, and claims priority from, Taiwan Application Serial Number 105131870, filed on Oct. 3, 2016, the disclosure of which is hereby incorporated by reference herein in its entirety.

TECHNICAL FIELD

The technical field relates to an electrode and a device employing the same.

BACKGROUND

Aluminum is the most abundant metal on earth and the third most abundant element in the earth's crust. An aluminum-based redox couple, which involves three electron transfers during electrochemical charge and discharge reactions, provides storage capacity that is competitive with that of a single-electron lithium-ion battery. Additionally, because of its lower reactivity and flammability in comparison with lithium, such an aluminum-ion battery might offer significant safety improvements.

Given the foregoing enhanced theoretical capacity of an aluminum-ion battery, aluminum-ion battery constructions are desirable in that they may feasibly and reliably provide enhanced battery performance, such as enhanced capacity and discharge voltage.

The capacity of an aluminum-ion battery is proportional to the amount of graphite in the aluminum-ion battery. The positive electrode of a conventional aluminum-ion battery includes a current-collecting substrate and a graphite material bonded on the current-collecting substrate via an adhesive agent. The adhesive agent, however, not only reduces the electrical conductivity between the current-collecting substrate and the active material but also lengthens the processing time of the positive electrode. Furthermore, due to the adhesive agent, the graphite material located in the deeper position near the current-collecting substrate will not be infiltrated by the electrolyte.

Hence, it is against this background that a need arose to develop embodiments of this disclosure.

SUMMARY

According to embodiments of the disclosure, the disclosure provides an electrode. The electrode can include a main body and an active material. The main body comprises a cavity, and the main body is made of a conductive network structure. The active material is disposed in the cavity, wherein the length of the longest side of the particle of the active material is greater than the length of the longest side of the pore of the conductive network structure.

According to other embodiments of the disclosure, the disclosure provides a device. The device includes a first electrode, a first separator, and a second electrode, wherein the first electrode is the aforementioned electrode, and wherein the first separator is disposed between the first electrode and the second electrode.

A detailed description is given in the following embodiments with reference to the accompanying drawings.

DETAILED DESCRIPTION

Figure 1:
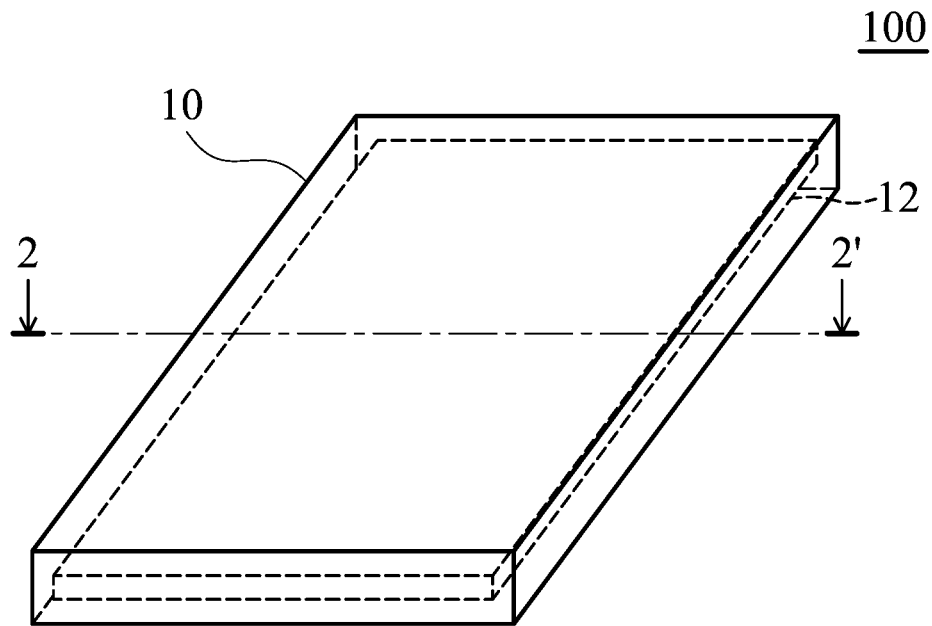
FIG. 1 is a perspective view of the electrode according to an embodiment of the disclosure.

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

The disclosure provides an electrode (such as a positive electrode of the metal-ion battery) and a device (such as a metal-ion battery) employing the same. The electrode includes a main body and an active material. The main body, having a cavity, is made of a conductive network structure, and the active material is disposed in the cavity. Since the length of the longest side of the particle of the active material is greater than the length of the longest side of the pore of the conductive network structure and the Van der Waals force exists between the active materials, the active material may be confined in the cavity surrounded by the conductive material having a network structure, thereby forming an electrode having a tea bag-like sealed structure. As a result, the active material of the disclosure can be bonded in the conductive network structure in the absence of an adhesive agent. Therefore, the performance of the battery of the disclosure would not be deteriorated by an adhesive agent, and the complexity of the process for fabricating the electrode can be reduced. Since the active material of the electrode is encapsulated by the conductive network structure, the active material disposed in the cavity is apt to be infiltrated by the electrolyte, thereby increasing the utilization rate of the active material and increasing the storage capacity and the total capacity generation of the device employing the electrode. On the other hand, an active layer can be further disposed on the surface of the conductive network structure to cover the surface of the conductive network structure. As a result, the loading amount of the active material of the electrode can be increased. Furthermore, due to the Van der Waals force between the active layer disposed on the sidewall of the cavity and the active material disposed in the cavity, the conductive material has a network structure that can combine closely with the active material, thereby enhancing current conduction of the electrode and increasing the specific capacity of the device employing the electrode during charging and discharging at high current density.

Figure 2:
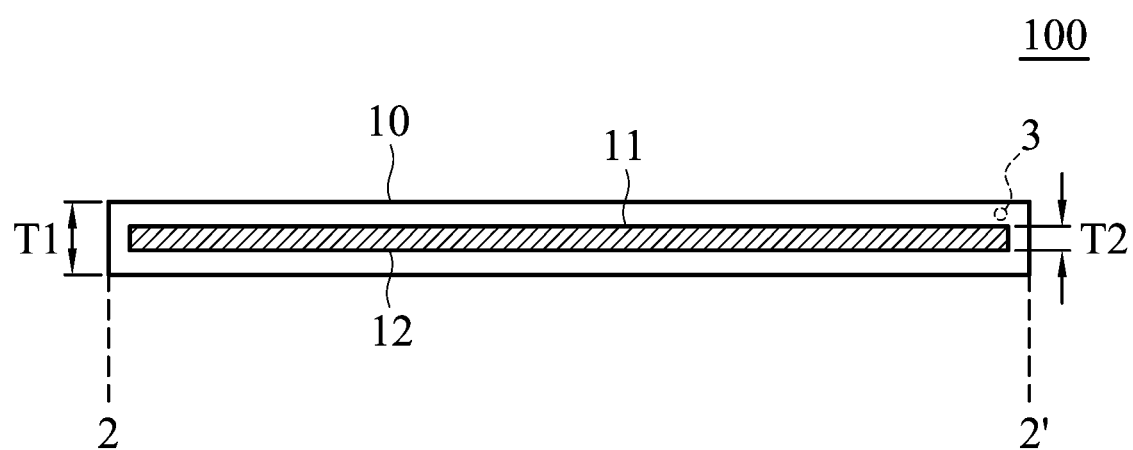
FIG. 2 is a cross-sectional view along line 2-2' of the electrode shown in FIG. 1.

FIG. 1 is a perspective view of the electrode 100 according to an embodiment of the disclosure. As shown in FIG. 1, the electrode 100 includes a main body 10 (such as a plate-shaped main body or a sheet-shaped main body) and an active material 12. FIG. 2 is a cross-sectional view along line 2-2' of the electrode 100 shown in FIG. 1. As shown in FIG. 2, the main body 10 includes a cavity 11, and the active material 12 is disposed in the cavity 11. Namely, the active material 12 is encapsulated in the main body 10. According to embodiments of the disclosure, the active material 112 can be present at a level that is equal to or greater than 50% of the cavity by volume, such as between 50% and 98% of the cavity by volume. The main body 10 can be a conductive network structure. Therefore, the active material is encapsulated by the conductive network structure (such as a conductive material having a network structure). As a result, the electrolyte can freely pass through the conductive network structure, and thus the active material in the cavity can be infiltrated more conveniently. As shown in FIG. 2, the main body 10 can have a thickness T1 from about 50 nm to 10 mm, such as from about 100 nm to 5 mm, from about 200 nm to 4 mm, or from about 500 nm to 1 mm. The cavity can have a thickness T2 from about 10 nm to 8 mm, such as from about 20 nm to 5 mm. Furthermore, the thickness T2 of the cavity can be adjusted to meet practical requirements.

Figure 3:
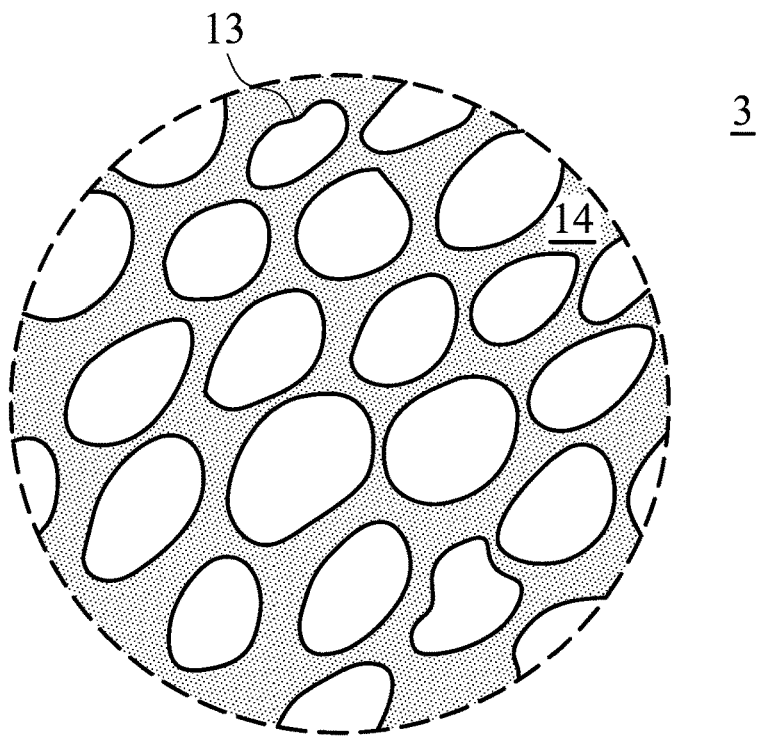
FIG. 3 is an enlarged view of the region 3 of the electrode shown in FIG. 2.

According to embodiments of the disclosure, suitable materials for the conductive network structure can be a foaming metal material 14. FIG. 3 is an enlarged view of the region 3 of the electrode shown in FIG. 2. As shown in FIG. 3, the main body 10 can be made of a foaming metal material 14 (such as foaming nickel, foaming iron, foaming copper, foaming cobalt, foaming titanium, or a foaming alloy thereof (such as a foaming alloy including nickel, iron, copper, cobalt, and/or titanium). The foaming metal material 14 can include a plurality of pores 13, and the pores 13 are distributed three-dimensionally within the metal foaming material 14. Therefore, the pores 13 may be interconnected with each other to form an irregular-geometric-shaped and slender pore, and the metal foaming material 14 can have a sponge-like configuration. In order to encapsulate the active material 12 with a metal foaming material 14, the length of the longest side of the particle of the active material is greater than the length of the longest side of the pore of the conductive network structure. For example, the length of the longest side of the pore of the conductive network structure can be from about 1 nm to 1 mm. Therefore, the active material 12 cannot be detached from the cavity 11 via the pore 13 of the metal foaming material 14. Namely, the particle of the active material 12 cannot pass through the metal foaming material 14 via the pore 13, and the active material 12 is completely confined in the cavity 11 of the main body 10. A porosity of the foaming metal material can be greater than about 50%, such as from about 50% to 98%. The porosity may be the quotient of the volume of the pores over the total volume of the pores and the metal foaming material.

Figure 4:
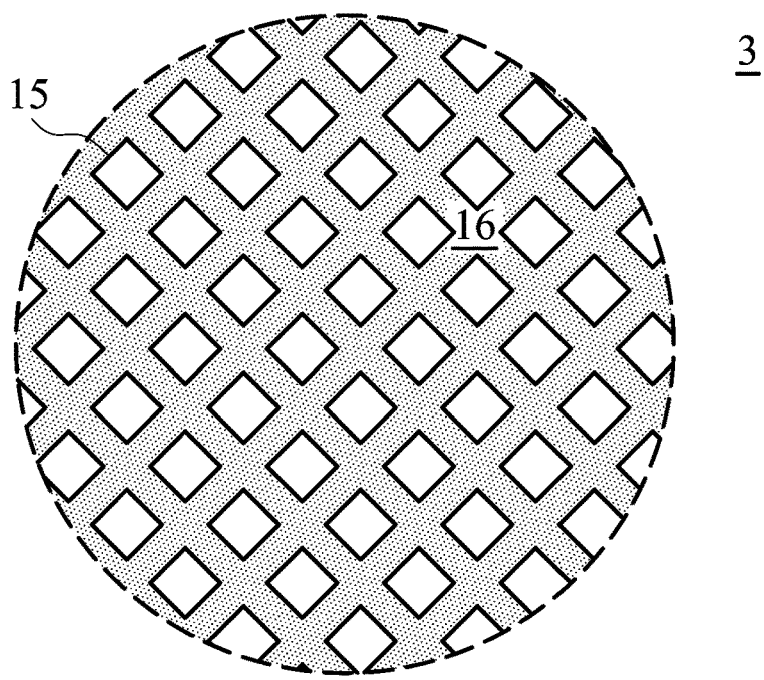
FIG. 4 is an enlarged view of the region 3 of the electrode shown in FIG. 2 according to other embodiments.

According to embodiments of the disclosure, the conductive network structure can be metal net 16. FIG. 4 is an enlarged view of the region 3 of the electrode 100 shown in FIG. 2 according to other embodiments. As shown in FIG. 4, the main body 10 can be made of a metal net 16, such as a nickel net, iron net, copper net, titanium net, cobalt net, or an alloy net thereof. The metal net 16 has a plurality of pores 15, and each pore 15 can be polygonal, circular, elliptic, irregular geometric, or a combination thereof.

The plurality of pores 15 can be separate from each other. The active material 12 does not pass through the metal net via the pores 15 of the metal net 16. Namely, the length of the longest side of the particle of the active material is greater than the length of the longest side of the pore 15 of the metal net 16. For example, the length of the longest side of the pore of the metal net 16 is from about 1 nm to 1 mm. Therefore, the active material 12 cannot be detached from the cavity 11 via the pore 15 of the metal net 16, and the active material 12 is completely confined in the cavity 11 of the main body 10. A porosity of the metal net can be greater than about 50%, such as from about 50% to 98%. The porosity may be the quotient of the volume of the pores over the total volume of the pores and the metal net.

According to embodiments of the disclosure, the active material includes a layered active layer or an agglomeration of a layered active layer. According to embodiments of the disclosure, the active material can be an intercalated carbon material, such as graphite (including natural graphite, artificial graphite, mesophase carbon microbeads, pyrolytic graphite, foaming graphite, flake graphite, or expanded graphite), multilayer graphene, graphene, carbon nanotube or a combination thereof. According to embodiments of the disclosure, the active material can be layered double hydroxide), layered oxide, layered chalcogenide or a combination thereof. The active material (such as powder, sheet, or strip), which does not pass through the pore of the conductive network structure, is selected, in order to ensure that the active material is confined in the cavity of the main body. In the selection of the active material, the active material can be disposed in a bowl-shaped carrier made of the conductive network structure in advance, and then the active material disposed in the bowl-shaped carrier is subjected to a vibration for a period of time (such as 1-100 hr) to observe whether the active material passes through the pore of the conductive network structure. If there is no active material which is detached from the bowl-shaped carrier, it means that the active material cannot pass through the pore of a main body made of the conductive network structure.

Figure 5:
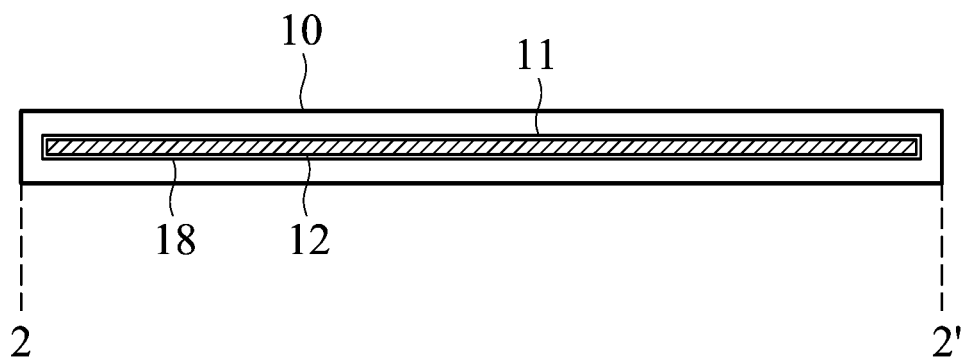
FIG. 5 is a cross-sectional view of the electrode according to another embodiment.
Figure 6:
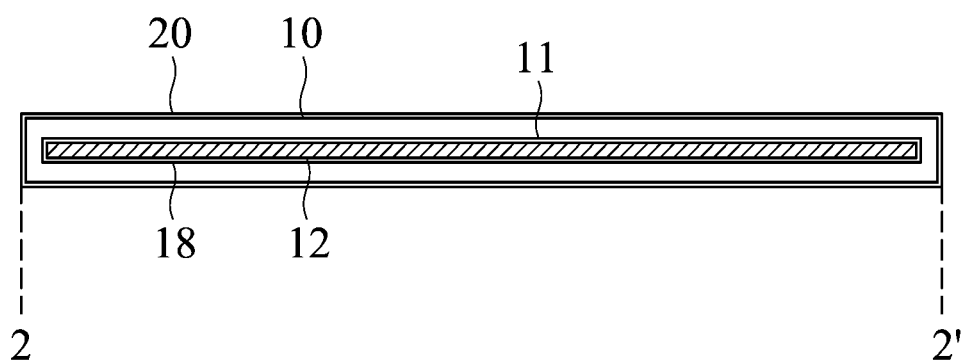
FIG. 6 is a cross-sectional view of the electrode according to other embodiments.

FIG. 5 is a cross-sectional view of the electrode according to another embodiment. As shown in FIG. 5, a first active layer 18 can be further disposed on an inner surface of the cavity 11. Thus, a Van der Waals force between the first active layer 18 and the active material 12 disposed in the cavity 11 is generated, thereby facilitating the main body 10 (i.e. the conductive material having a network structure) to combine closely with the active material 12. The first active layer 18 can be a graphite. The first active layer 18 can be formed on the conductive material having a network structure by chemical vapor deposition, and then the active material 12 is encapsulated in the conductive material. In addition, FIG. 6 is a cross-sectional view of the electrode according to other embodiments. As shown in FIG. 6, a second active layer 20 can be further disposed on an outer surface of the main body 10 (i.e. the conductive material having a network structure). The second active layer 20 can also be a graphite. The second active layer 20 can be formed on the main body 10 during the formation of the first active layer 18. Namely, the first active layer 18 and the second active layer 20 can be made of the same material and formed in the same process. In addition, the diameter of the pore of the conductive material having a network structure can be shrunk after the deposition of the first active layer and the second active layer.

The electrode of the disclosure can be formed in the following steps. First, a sheet made of the conductive network structure is provided. Next, the sheet is folded, and the active material is disposed in the spatial area of the folding sheet. According to embodiments of the disclosure, before folding the sheet, the sheet can be subjected to a deposition to form an active layer on the surface of the sheet. Next, the folding sheet having the active material is subjected to a lamination or a spot welding process to form a main body having a cavity, in order to encapsulate the active material in the cavity. After the lamination or a spot welding process, the folding sheet having the active material can be subjected to a rolling compaction, in order to force the active material to be distributed among the spatial area of the folding sheet and closely combine the active material with the conductive material (i.e. the conductive network structure). In addition, according to other embodiments of the disclosure, the electrode of the disclosure can be formed in the following steps. First, a first sheet and a second sheet made of the conductive network structure are provided, wherein the first sheet and the second sheet are the same size. The active material is disposed on the first sheet, and then the second sheet is covered on the first sheet, obtaining a stack of sheets. Next, the stack of sheets is subjected to a lamination or a spot welding process to form a main body having a cavity. Thus, the active material is encapsulated in the cavity.

Figure 7:
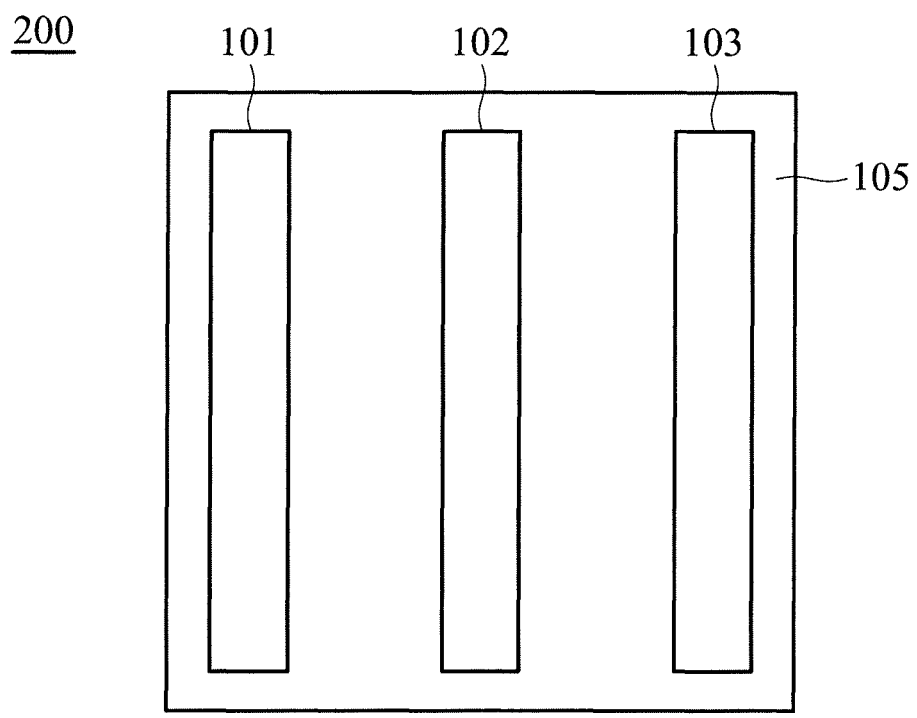
FIG. 7 is a cross-sectional view of the device according to some embodiments.

According to embodiments of the disclosure, the disclosure also provides a device, such as a metal-ion battery, or a capacitor. FIG. 7 is a cross-sectional view of the device 200 according to some embodiments. As shown in FIG. 7, the device 200 includes a first electrode 101, a first separator 102, and a second electrode 103, wherein the first electrode 101 is the aforementioned electrode of the disclosure, and the first separator 102 is disposed between the first electrode 101 and the second electrode 103. The device 200 can include an electrolyte 105, wherein the electrolyte 105 is disposed between the first electrode 101 and the second electrode 103. The device 200 can be a rechargeable secondary battery, although primary batteries also are encompassed by the disclosure.

According to embodiments of the disclosure, the device of the disclosure can further include a third electrode and a second separator, wherein the first electrode is disposed between the second electrode and the third metal electrode, and the second separator is disposed between the first electrode and the third electrode.

According to embodiments of the disclosure, the device 200 can be an aluminum-ion battery. In an embodiment of the disclosure, the battery 100 is an aluminum-ion battery, although other types of metal-ion batteries are encompassed by the disclosure. The second electrode 103 includes aluminum, such as a non-alloyed form of aluminum or an aluminum alloy. More generally, a suitable material of the second electrode 103 can include one or more of an alkali metal (e.g., lithium, potassium, sodium, and so forth), an alkaline earth metal (e.g., magnesium, calcium, and so forth), a transition metal (e.g., zinc, iron, nickel, cobalt, and so forth), a main group metal or metalloid (e.g., aluminum, silicon, tin, and so forth), or a metal alloy of two or more of the foregoing elements (e.g., an aluminum alloy).

The first separator 102 can mitigate against electrical shorting of the first electrode 101 and the second electrode 103, and the electrolyte 105 can support reversible deposition and dissolution (or stripping) of the first electrode 101, and reversible intercalation and de-intercalation of anions at the first electrode 101. The electrolyte 105 can include an ionic liquid, which can support reversible redox reaction of a metal or a metal alloy included in the second electrode 103.

Examples of ionic liquids can be urea, N-methylurea, choline chloride, ethylchlorine chloride, alkali halide, dimethyl sulfone, methylsulfonylmethane, alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, alkylguanidinium salt or mixtures thereof. For example, the electrolyte 105 can correspond to, or can include, a mixture of an aluminum halide and an ionic liquid, and a molar ratio of the aluminum halide and the ionic liquid is at least about 1.1 or 1.2, up to about 1.5, 1.8, or more, such as where the aluminum halide is $AlCl_3$, the ionic liquid is 1-ethyl-3-methylimidazolium chloride, and the molar ratio of the aluminum chloride to 1-ethyl-3-methylimidazolium chloride is greater than about 1.2. An ionic liquid electrolyte can be doped (or have additives added) to increase electrical conductivity and lower viscosity, or can be otherwise altered to yield compositions that favor the reversible electrodeposition of metals.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

Figure 8:
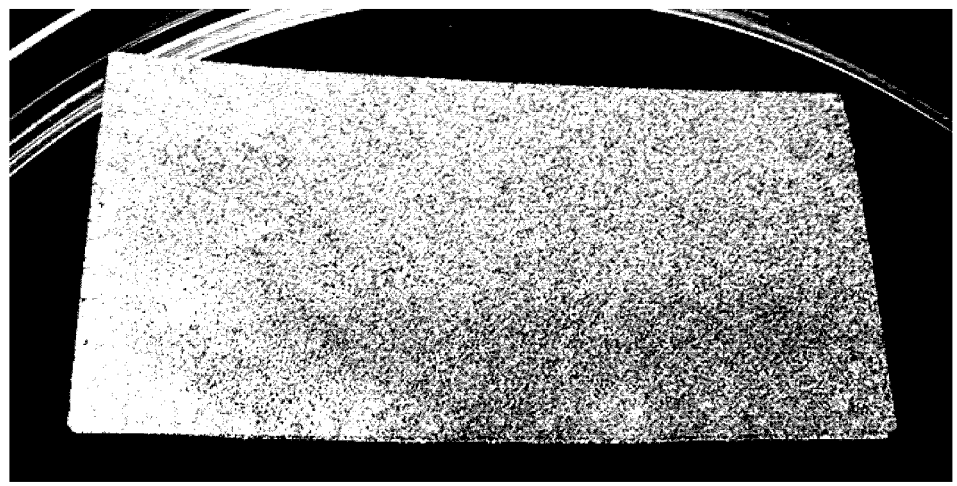
FIG. 8 is a photograph showing the appearance of the graphite electrode of Example 1.

First, a foaming nickel sheet (having a size of 70 mm×70 mm, a thickness of 0.2 mm, a porosity of 90%, and a pore diameter of about 200 μm) was provided. Next, the foaming nickel sheet was folded, and 125 mg of expanded graphite (the length of the longest side of the expanded graphite was 400-500 μm) was uniformly distributed on the spatial area of the folding sheet. Next, the folding sheet was subjected to a welding process to close the opening along the edge of the folding sheet in order to encapsulate the active material in the cavity of the foaming nickel sheet. Next, the folding nickel sheet was subjected to lamination by a calender mill, thereby closely combining the foaming nickel with the expanded graphite. Herein, the expanded graphite was agglomerated into an agglomeration due to the Van der Waals force. Therefore, a graphite electrode (having a size of 35 mm×70 mm) was formed, as shown in FIG. 8.

Next, an aluminum foil (with a thickness of 0.03 mm, manufactured by Alfa Aesar) was cut to obtain aluminum electrodes (having a size of 35 mm×70 mm). Next, separators (two layers of 8×9 cm² with trade No. Whatman) were provided. Next, the aluminum electrode, the separator, the graphite electrode, the separator, and the aluminum electrode were placed in sequence and sealed within an aluminum plastic pouch. Next, an electrolyte (including aluminum chloride ($AlCl_3$) and 1-ethyl-3-methylimidazolium chloride ([EMIm]Cl), wherein the molar ratio between $AlCl_3$ and [EMIm]Cl was about 1.4) was injected into the aluminum plastic pouch, obtaining the aluminum-ion battery (1).

Figure 9:
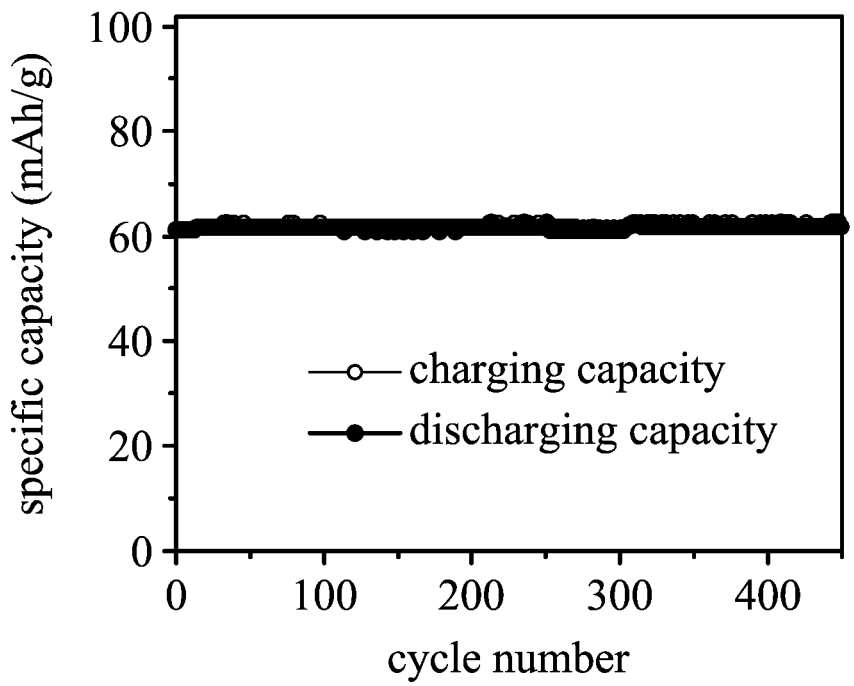
FIGS. 9-12 are graphs showing the results of cycling stability tests of the aluminum-ion batteries according to Examples 1 and 2, and Comparative Example 2.

Next, the aluminum-ion battery (1) of Example 1 was charged (to about 2.45V) and discharged (to about 1V) at a current density of about 1000 mA/g by a NEWARE battery analyzer to analyze the performance thereof, and the results are shown in FIG. 9 and Table 1.

Example 2

Example 2 was performed in the same manner as Example 1 except that the amount of the expanded graphite was increased from 125 mg to 140 mg. Thus, an aluminum-ion battery (2) was obtained.

Figure 10:
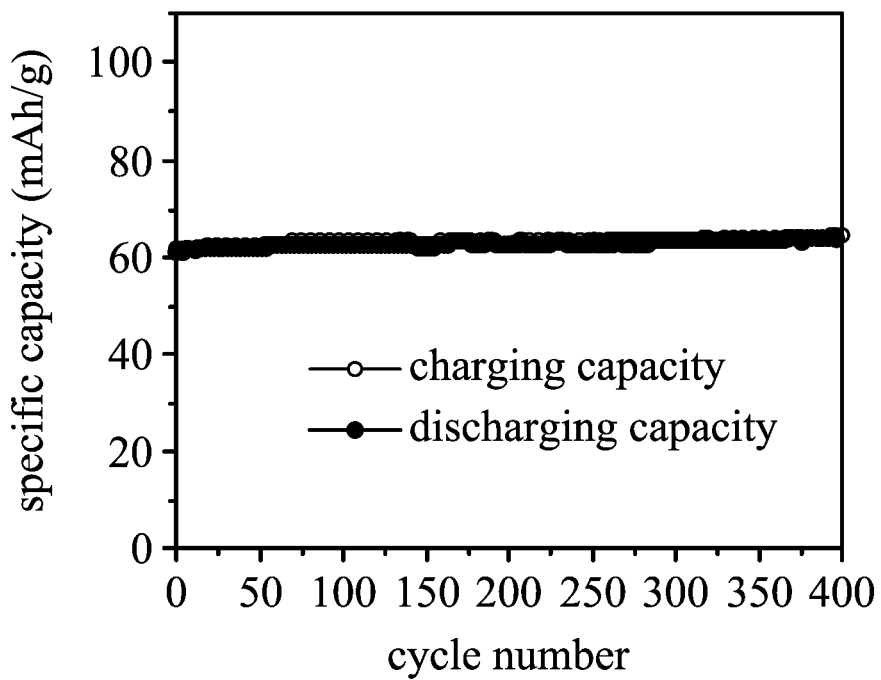

Next, the aluminum-ion battery (2) of Example 1 was charged (to about 2.45V) and discharged (to about 1V) at a current density of about 1000 mA/g by a NEWARE battery analyzer to analyze the performance thereof, and the results are shown in FIG. 10 and Table 1.

Comparative Example 1

First, a foaming nickel sheet (having a size of 35 mm×70 mm, a thickness of 0.2 mm, a porosity of 90%, and a pore diameter of about 200 μm) was provided. Next, a coating of a composition was formed on the surface of the foaming nickel sheet by coating. The composition included 200 mg of expanded graphite powder, 22 mg of adhesive (polyacrylic acid), and a solvent (N-methyl-2-pyrrolidone). Next, the foaming nickel sheet was baked in a vacuum furnace at 100° C. After baking for 2 days, a graphite electrode was obtained.

Next, an aluminum foil (with a thickness of 0.03 mm, manufactured by Alfa Aesar) was cut to obtain aluminum electrodes (having a size of 35 mm×70 mm). Next, separators (two layers of 8×9 cm² with trade No. Whatman) were provided. Next, the aluminum electrode, the separator, the graphite electrode, the separator, and the aluminum electrode were placed in sequence and sealed within an aluminum plastic pouch. Next, an electrolyte (including aluminum chloride ($AlCl_3$) and 1-ethyl-3-methylimidazolium chloride ([EMIm]Cl), wherein the molar ratio between $AlCl_3$ and [EMIm]Cl was about 1.4) was injected into the aluminum plastic pouch, obtaining the aluminum-ion battery (3).

Figure 11:
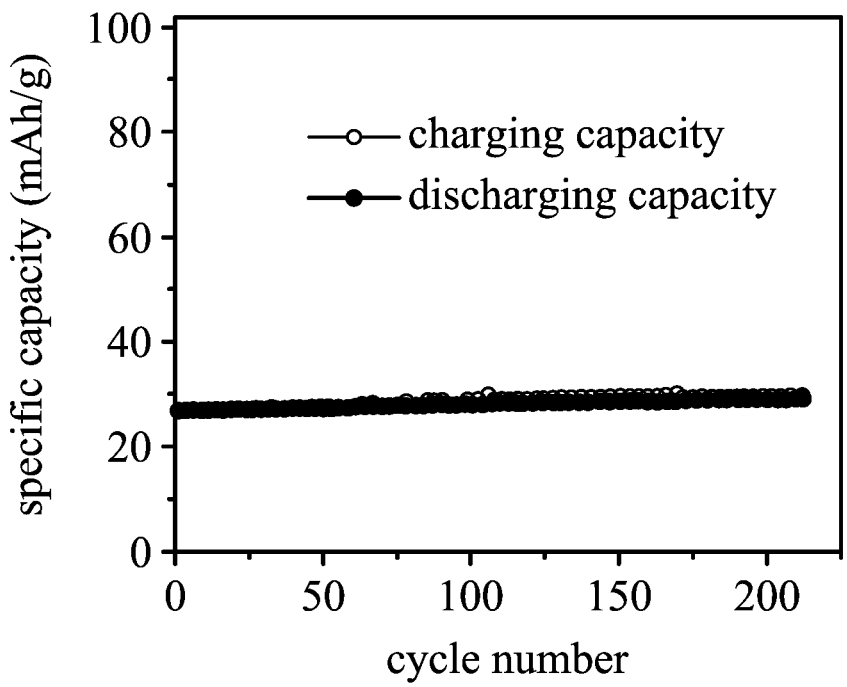

Next, the aluminum-ion battery (3) of Example 1 was charged (to about 2.45V) and discharged (to about 1V) at a current density of about 1000 mA/g by a NEWARE battery analyzer to analyze the performance thereof, and the results are shown in FIG. 11 and Table 1.

Comparative Example 2

First, a carbon paper (having a size of 35 mm×70 mm) was provided. Next, a composition including 121 mg, of expanded graphite powder, 13.4 mg of adhesive (polyacrylic acid), and a solvent (N-methyl-2-pyrrolidone) was provided. Next, a coating of the composition was formed on the surface of the carbon paper by blade coating. Next, the carbon paper was baked in a vacuum furnace at 100° C. After baking for 2 days, a graphite electrode was obtained.

Next, an aluminum foil (with a thickness of 0.03 mm, manufactured by Alfa Aesar) was cut to obtain aluminum electrodes (having a size of 35 mm×70 mm). Next, separators (two layers of 8×9 cm² with trade No. Whatman) were provided. Next, the aluminum electrode, the separator, the graphite electrode, the separator, and the aluminum electrode were placed in sequence and sealed within an aluminum plastic pouch. Next, an electrolyte (including aluminum chloride ($AlCl_3$) and 1-ethyl-3-methylimidazolium chloride ([EMIm]Cl), wherein the molar ratio between $AlCl_3$ and [EMIm]Cl was about 1.4) was injected into the aluminum plastic pouch, obtaining the aluminum-ion battery (4).

Figure 12:
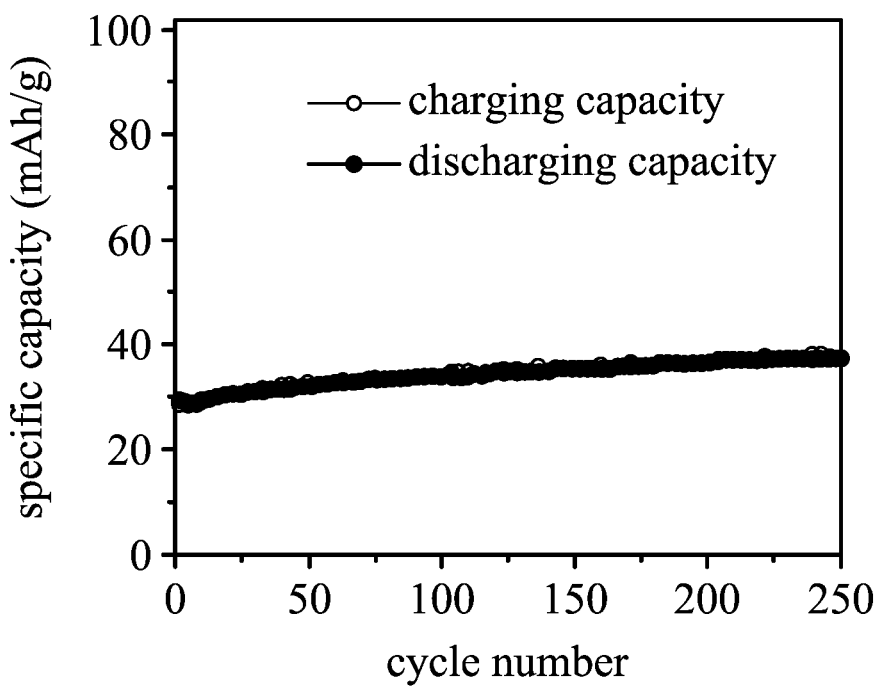

Next, the aluminum-ion battery (4) of Example 1 was charged (to about 2.45V) and discharged (to about 1V) at a current density of about 1000 mA/g by a NEWARE battery analyzer to analyze the performance thereof, and the results are shown in FIG. 12 and Table 1.

TABLE 1

|  | graphite load of the graphite electrode (mg) | specific capacity (mAh/g) |
|---|---|---|
| Example 1 | 125 | ~62 |
| Example 2 | 140 | ~62 |
| Comparative Example 1 | 200 | ~37 |
| Comparative Example 2 | 121 | ~29.4 |

As shown in Table 1, the graphite electrodes of Examples 1 and 2 included the expanded graphite powder encapsulated in the conductive material having a network structure (foaming nickel), and no adhesive agent exists in the graphite electrodes. Therefore, the electrolyte of the battery can freely pass through the conductive network structure, and thus the expanded graphite in the cavity can be more conveniently infiltrated by the electrolyte. As a result, the specific capacity of the aluminum-ion battery (2) was maintained even when the graphite load was increased (from 125 mg to 140 mg). In addition, the aluminum-ion batteries (3) and (4), having high graphite load of the graphite electrode, as disclosed in Comparative Examples 1 and 2, exhibit low specific capacity due to the use of the adhesive agent. Therefore, compared with Comparative Examples 1 and 2 employing the adhesive agent, the complexity of the process for fabricating the electrode disclosed in Examples 1 and 2 is reduced since the baking process for removing the solvent of the coating composition has been omitted, and the performance of the battery disclosed in Examples 1 and 2 is not deteriorated by the adhesive agent.

Example 3

First, a foaming nickel sheet (having a size of 70 mm×70 mm, a thickness of 0.2 mm, a porosity of 90%, and a pore diameter of about 200 μm) was provided. Next, the foaming nickel sheet was disposed in a vacuum furnace, and a vapor deposition was performed in the presence of methane (as reaction source gas) and hydrogen and argon (as carrier gas) at 900-1100° C. to form a graphite layer (40 mg) covering on the surface of the foaming nickel sheet.

Figure 13:
FIG. 13 is a photograph showing the appearance of the graphite electrode of Example 3.

Next, the foaming nickel sheet was folded, and 51 mg of expanded graphite (the length of the longest side of the expanded graphite was 400-500 μm) was uniformly distributed on the spatial area of the folding sheet. Next, the folding sheet was subjected to a welding process to close the opening along the edge of the folding sheet in order to encapsulate the active material in the cavity of the foaming nickel sheet. Next, the folding nickel sheet was subjected to a lamination by a calender mill, thereby closely combining the foaming nickel sheet with the expanded graphite. Herein, the expanded graphite was agglomerated into an agglomeration due to the Van der Waals force. Therefore, a graphite electrode (having a size of 35 mm×70 mm) was formed, as shown in FIG. 13.

Next, an aluminum foil (with a thickness of 0.03 mm, manufactured by Alfa Aesar) was cut to obtain aluminum electrodes (having a size of 35 mm×70 mm). Next, separators (two layers of 8×9 cm² with trade No. Whatman) were provided. Next, the aluminum electrode, the separator, the graphite electrode, the separator, and the aluminum electrode were placed in sequence and sealed within an aluminum plastic pouch. Next, an electrolyte (including aluminum chloride ($AlCl_3$) and 1-ethyl-3-methylimidazolium chloride ([EMIm]Cl), wherein the molar ratio between $AlCl_3$ and [EMIm]Cl was about 1.4) was injected into the aluminum plastic pouch, obtaining the aluminum-ion battery (5).

Figure 14:
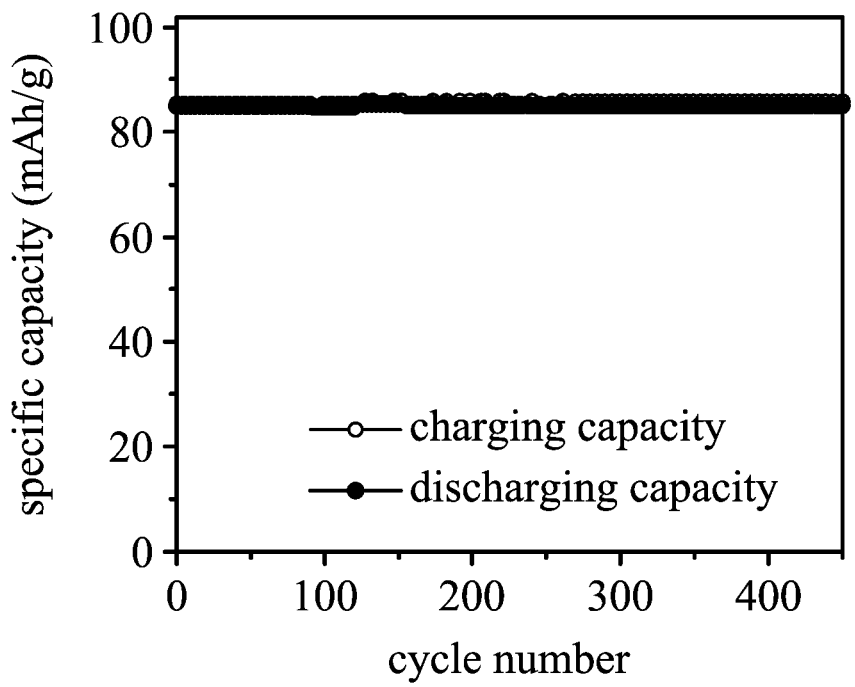
FIGS. 14-15 are graphs showing the results of cycling stability tests of the aluminum-ion batteries according to Examples 3 and 4.

Next, the aluminum-ion battery (5) of Example 3 was charged (to about 2.45V) and discharged (to about 1V) at a current density of about 1000 mA/g by a NEWARE battery analyzer to analyze the performance thereof, and the results are shown in FIG. 14 and Table 2.

Example 4

Example 4 was performed in the same manner as Example 3 except that the amount of the graphite layer was increased from 40 mg to 51 mg, and the amount of the graphite was increased from 51 mg to 96 mg. Thus, an aluminum-ion battery (6) was obtained.

Figure 15:
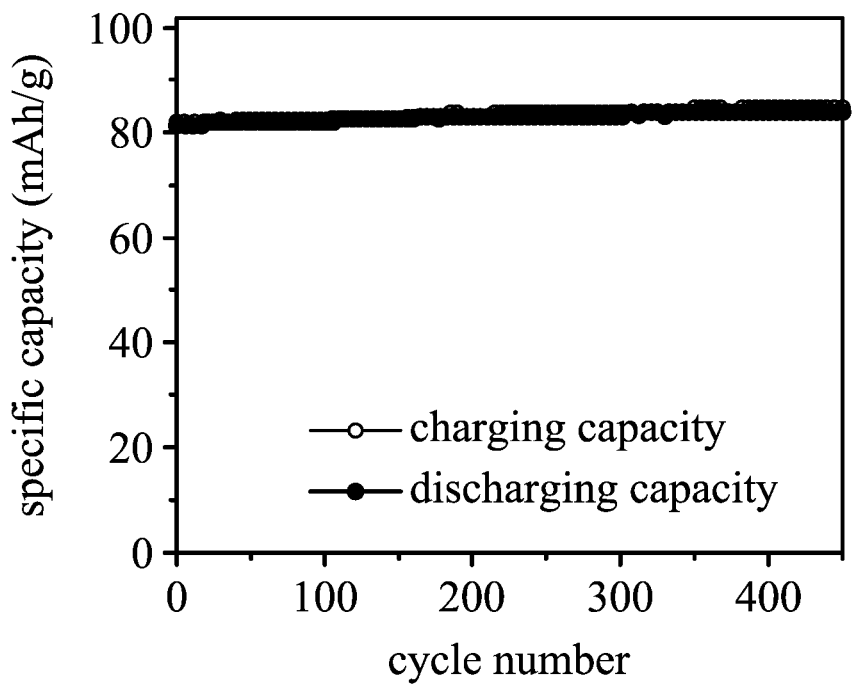

Next, the aluminum-ion battery (6) of Example 4 was charged (to about 2.45V) and discharged (to about 1V) at a current density of about 1000 mA/g by a NEWARE battery analyzer to analyze the performance thereof, and the results are shown in FIG. 15 and Table 2.

TABLE 2

|  | graphite load of the graphite electrode (mg) | specific capacity (mAh/g) |
| --- | --- | --- |
| Example 3 | 91 | ~83 |
| Example 4 | 147 | ~83 |

The graphite electrodes of the aluminum-ion batteries (5) and (6) as disclosed in Examples 3 and 4 further include a graphite layer deposited and covered on the surface of the nickel foaming. As a result, the active material loading amount of the electrode is increased, and the foaming nickel sheet is closely combined with the expanded graphite due to the Van der Waals force between the graphite layer and the expanded graphite encapsulated in the foaming nickel. Thus, the current conduction of the electrode is enhanced, and the specific capacity (83 mAh/g) of the aluminum-ion batteries (5) and (6) employing the electrode is increased during charging and discharging at high current density. In addition, the graphite electrodes of Examples 3 and 4 included the expanded graphite powder encapsulated in the conductive material having a network structure (foaming nickel having a graphite layer), and no adhesive agent exists in the graphite electrodes. Therefore, the electrolyte of the battery can freely pass through the conductive network structure, and thus the expanded graphite in the cavity can be more conveniently infiltrated by the electrolyte. As a result, the specific capacity of the aluminum-ion battery (6) was maintained even when the graphite load was increased (from 91 mg to 147 mg), and thus the total capacity of the aluminum-ion battery is increased. Conversely, the electrolyte would not infiltrate the active material when the conductive material does not have a network structure. Therefore, the capacity would not be increased even though the graphite load increases.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An aluminum-ion battery, comprising:
   a first electrode, wherein the first electrode comprises:
      a main body, wherein the main body comprises a cavity, and the main body is made of a conductive network structure; and
      an active material disposed in the cavity, wherein the length of the longest side of the particle of the active material is greater than the length of the longest side of the pore of the conductive network structure, such that the active material is confined in the conductive network structure, and wherein the active material is graphite, carbon nanotube, graphene, or a combination thereof;
   a first separator;
   a second electrode, wherein the first separator disposed between the first electrode and the second electrode, and wherein the second electrode comprises aluminum or aluminum alloy; and
   an electrolyte disposed between the first electrode and the second electrode, wherein the electrolyte comprises a mixture of an aluminum halide and an ionic liquid,
   wherein the active material is confined in a single cavity that is completely encapsulated by the conductive network structure.

2. The aluminum-ion battery as claimed in claim 1, wherein the conductive network structure comprises a metal three-dimensional foaming network structure, or a metal network structure.

3. The aluminum-ion battery as claimed in claim 2, wherein a material of the metal three-dimensional foaming network structure is foaming nickel, foaming iron, foaming copper, foaming titanium, foaming cobalt, or a foaming alloy thereof.

4. The aluminum-ion battery as claimed in claim 2, wherein a material of the metal network structure is nickel net, iron net, copper net, titanium net, cobalt net, or an alloy net thereof.

5. The aluminum-ion battery as claimed in claim 1, wherein the conductive network structure has a porosity from 50% to 98%.

6. The aluminum-ion battery as claimed in claim 1, wherein the length of the longest side of the pore of the conductive network structure is from 1 nm to 1 mm.

7. The aluminum-ion battery as claimed in claim 1, wherein the active material is present at a level that is equal to or greater than 50% of the cavity by volume.

8. The aluminum-ion battery as claimed in claim 1, further comprising:
   a first active layer disposed on an inner surface of the conductive network structure.

9. The aluminum-ion battery as claimed in claim 8, further comprising:
   a second active layer disposed on an outer surface of the conductive network structure.

10. The aluminum-ion battery as claimed in claim 1, further comprising:
    a third metal electrode, wherein the first electrode is disposed between the second electrode and the third metal electrode; and a second separator, wherein the second separator is disposed between the first electrode and the third metal electrode.

\* \* \* \* \*